(12) United States Patent
Pain et al.

(10) Patent No.: US 10,082,338 B2
(45) Date of Patent: Sep. 25, 2018

(54) CONTINUOUS HEAT TREATMENT METHOD FOR AN ELECTRICALLY CONDUCTIVE FLUID

(75) Inventors: Jean-Pierre Lucien Joseph Pain, Castelnau le Lez (FR); Stephanie Roux, Mollans sur Ouveze (FR); Mario Massa, Reggio Emilia (IT)

(73) Assignees: UNIVERSITE DE MONTPELLIER, Montpellier (FR); EMMEPIEMME, Piacenza (IT)

( * ) Notice: Subject to any disclaimer, the term of this patent is extended or adjusted under 35 U.S.C. 154(b) by 507 days.

(21) Appl. No.: 13/981,981

(22) PCT Filed: Jan. 27, 2011

(86) PCT No.: PCT/IB2011/000465
§ 371 (c)(1),
(2), (4) Date: Jul. 26, 2013

(87) PCT Pub. No.: WO2012/101470
PCT Pub. Date: Aug. 2, 2012

(65) Prior Publication Data
US 2013/0315574 A1 Nov. 28, 2013

(51) Int. Cl.
*H05B 3/60* (2006.01)
*F28D 15/00* (2006.01)
(Continued)

(52) U.S. Cl.
CPC .............. *F28D 15/00* (2013.01); *A23L 3/005* (2013.01); *A23L 5/15* (2016.08); *F24H 1/103* (2013.01); *H05B 3/60* (2013.01); *Y10T 137/6579* (2015.04)

(58) Field of Classification Search
None
See application file for complete search history.

(56) References Cited

U.S. PATENT DOCUMENTS 1,352,547 A * 9/1920 Seimbille .......................... 237/16
1,429,735 A * 9/1922 Hornsby ................. F24H 1/102
392/314
(Continued)

FOREIGN PATENT DOCUMENTS

EP      0032464 A1    7/1981
EP      0457179 A1    11/1991
(Continued)

OTHER PUBLICATIONS

International Search Report from PCT Application No. PCT/IB2011/000465; dated Jul. 6, 2011.

*Primary Examiner* — Thor Campbell
(74) *Attorney, Agent, or Firm* — Greer, Burns & Crain, Ltd.

(57) ABSTRACT

A method is provided for heating an electrically conductive fluid, including steps of: (i) circulating the fluid in a circuit from an inlet to an outlet, through an inlet path of the circuit in which the fluid flows in a first average direction and an outlet path of the circuit in which the fluid flows in a second average direction substantially opposite to the first direction; (ii) subjecting the fluid to a specific ohmic heating while the fluid flows through the outlet path; and (iii) transferring heat from the fluid flowing through the outlet path to the fluid flowing through the inlet path by thermal conduction through an at least partially first electrically insulated partition wall. An associated heating device is also provided.

9 Claims, 3 Drawing Sheets

(51) Int. Cl.
    *A23L 3/005*     (2006.01)
    *F24H 1/10*     (2006.01)
    *A23L 5/10*     (2016.01)

(56) References Cited

U.S. PATENT DOCUMENTS

| | | | | |
|---|---|---|---|---|
| 1,480,515 A * | 1/1924 | Caselli | ............ | F24H 1/106 392/314 |
| 1,501,768 A * | 7/1924 | Graetzer | ............ | F24H 1/106 392/314 |
| 1,767,122 A * | 6/1930 | Dean | ............ | F24H 1/142 392/483 |
| 1,850,156 A * | 3/1932 | Richardson | ............ | F24H 1/102 392/492 |
| 2,058,054 A * | 10/1936 | Bidwell | ............ | F24H 1/20 392/311 |
| 3,138,696 A * | 6/1964 | Eaton | ............ | A23L 3/18 392/316 |
| 3,181,099 A * | 4/1965 | McGivern | ............ | H01C 10/02 323/296 |
| 3,350,915 A * | 11/1967 | Staffin | ............ | G01K 15/005 165/104.16 |
| 3,867,610 A * | 2/1975 | Quaintance | ............ | F24H 1/106 338/83 |
| 4,369,351 A * | 1/1983 | Massey | ............ | F24H 1/106 241/1 |
| 4,378,846 A * | 4/1983 | Brock | ............ | E21B 36/04 166/303 |
| 4,604,515 A * | 8/1986 | Davidson | ............ | F24H 9/2028 219/486 |
| 4,730,098 A * | 3/1988 | Cave | ............ | H05B 3/60 338/80 |
| 4,762,980 A * | 8/1988 | Insley | ............ | F24H 1/103 338/305 |
| 4,838,154 A * | 6/1989 | Dunn | ............ | A23C 3/0335 99/451 |
| 4,857,343 A * | 8/1989 | Hekal | ............ | A23C 9/144 204/522 |
| 4,953,536 A * | 9/1990 | Israelsohn | ............ | F24H 1/106 237/2 R |
| 5,084,153 A * | 1/1992 | Mosse | ............ | A23L 3/005 204/230.3 |
| 5,091,152 A * | 2/1992 | Thomas, Sr. | ............ | A61L 2/02 204/228.6 |
| 5,440,667 A * | 8/1995 | Simpson | ............ | F24H 1/106 219/509 |
| 5,768,472 A | 6/1998 | Reznik | | |
| 7,050,706 B2 * | 5/2006 | Israelsohn | ............ | F24H 1/106 392/314 |
| 7,190,886 B2 * | 3/2007 | Dubicki | ............ | F24H 1/106 392/311 |
| 7,817,906 B2 * | 10/2010 | Callahan | ............ | F24H 1/106 392/311 |
| 8,346,069 B2 * | 1/2013 | Yeung | ............ | F24H 1/106 392/465 |
| 8,463,117 B2 * | 6/2013 | Yeung | ............ | F24H 1/106 392/465 |
| 2011/0008026 A1 * | 1/2011 | Campbell | ............ | H05B 3/60 392/311 |

FOREIGN PATENT DOCUMENTS

FR            2863829 A1     6/2005
WO       2007/027109 A1     3/2007

\* cited by examiner

CONTINUOUS HEAT TREATMENT METHOD FOR AN ELECTRICALLY CONDUCTIVE FLUID

FIELD OF THE INVENTION

The invention relates to the heating of fluids, and more particularly to continuous heat treatments applied to fluid foodstuff. Such fluid foodstuff may include in particular liquids that need to be pasteurized, sterilized, heated, coagulated such as liquid egg, blood and dairy products.

The invention further relates to the heating of other fluids, such as for instance creams or other similar products in the cosmetics industry.

BACKGROUND

Ohmic heating is a well-known method for heating liquids. A pair of electrodes is used to apply a voltage or an electrical field and generate an electrical current directly through the liquid medium to be treated. This technique can be applied to liquids containing free ions, which are therefore electrical conductors. The movements of the electrical charges create heat in the product according to Joule's law. Heat generation is a direct function of geometry, the electrical conductivity of a given product, and voltage. Ohmic heating is a volume heating, as opposed to heating by convection from the hot surface of a heat exchanger.

When this method is applied to a fluid circulating in a duct to implement a continuous heating process, the liquid circulating at low speed close to the walls of the duct reaches higher temperature than the liquid circulating at higher speed at the centre of the duct because of its longer exposition to voltage. Hence, overheating of the liquid may be experienced close to the walls due to the non-uniform profile of speeds in a cross-section of the duct, which is due to the viscosity of the liquid. The overheating of the liquid may in turn result in detrimental effects such as coagulation, fouling and/or clogging and to the interruption of the production line.

Document FR 2 863 829 discloses a continuous heat treatment of a fluid that is heated via electrodes spaced along the longitudinal flowing axis. The surface temperature of the fluid is controlled thanks to temperature sensors associated with an outside cooling flow. By continuously lowering the surface temperature, this concept decreases pipe clogging. However, a cooling fluid is needed to cool the main fluid, and an additional system comprising pumps, pipes and other devices is also needed to handle that cooling fluid. As a result, the system is complex, costly and requires an increased maintenance. In addition, the energy transferred to the cooling fluid is lost.

SUMMARY

An object of the invention is to address the above-mentioned problems and provide a method and a device for continuous volume heating and/or cooking of liquids allowing a substantial reduction of the clogging and/or fouling effects resulting from continuous ohmic heating of a viscous fluid flowing through a heating circuit.

Another object of the invention is to provide a method and a device for continuous volume heating and/or cooking of liquids which is simpler than prior art methods and devices, well adapted to industrial production processes, and with reduced manufacturing and maintenance costs.

According to a first aspect of the invention, there is provided a method for heating an electrically conductive fluid, comprising steps of:
circulating the fluid in a circuit from an inlet to an outlet, through an inlet path of the circuit in which the fluid flows in a first average direction, and through an outlet path of the circuit in which the fluid flows in a second average direction substantially opposite to the first direction,
subjecting the fluid to ohmic heating while the fluid flows through the outlet fluid path,
the method further comprising a step of transferring heat from the fluid flowing through the outlet path to the fluid flowing through the inlet path by thermal conduction through an at least partially electrically insulated partition wall separating said inlet path and said outlet path.

The warmer liquid circulating through the outlet path in particular at the vicinity of the partition wall is cooled by the cooler liquid circulating through the inlet path. So the risk of overheating of the liquid circulating with a low speed close to the wall is substantially reduced, and no secondary cooling circuit is needed for cooling that fluid close to the partition wall. In addition, the method allows optimizing the energy consumption of the process as the heat extracted from the fluid in the outlet path is used to pre-heat that same fluid in the inlet path, and not lost in a coolant like in prior art devices and methods.

The fluid may be a liquid, a gel or a paste, or a mixture of liquid and solid substances. It may also become solid due for instance to cooking in the outlet path, and be extruded through the outlet.

For a better efficiency, it is preferred that the fluid flows or circulates continuously from the inlet to the outlet. If the flow varies however, the ohmic heating may be adapted accordingly.

The method of the invention may further comprise a step of subjecting the fluid to ohmic heating while said fluid flows through the inlet path.

According to some embodiments, the method may further comprise at least one of the following steps:
applying at least one voltage inducing ohmic heating in the fluid flowing through the inlet path between at least two electrodes arranged in said inlet path;
applying at least one voltage in the fluid flowing through the outlet path between at least two electrodes arranged in said outlet path.

It may also further comprise at least one of the following steps:
applying a first and a second voltage inducing ohmic heating in the fluid flowing through the inlet path, said first voltage being applied between a first electrode arranged substantially toward a first axial end of the inlet path and a second electrode arranged substantially toward the middle of the inlet path, and said second voltage being applied between said second electrode and a third electrode arranged substantially toward a second axial end of the inlet path,
applying a third and a fourth voltage inducing ohmic heating in the fluid flowing through the outlet path, said third voltage being applied between a fourth electrode arranged substantially toward a first axial end of the outlet path and a fifth electrode arranged substantially toward the middle of the outlet path, and said fourth voltage being applied between said fifth electrode and a sixth electrode arranged substantially toward a second axial end of the outlet path.

Applying several voltages inducing ohmic heating in the fluid allows increasing the efficiency of the heating and thus improving the flow rates to be treated.

The method of the invention may further comprise a step of inducing ohmic heating in the fluid by applying AC (alternating current) voltage between electrodes at least partially in contact with the fluid.

Using AC voltages allows avoiding electrolysis effects which may happen with DC voltages. AC voltages may be radiofrequency signals, for instance comprising frequencies around 30 kHz, and of any waveform (sinus, square wave, ... ).

According to some embodiments, the method of the invention may further comprise:
- a step of circulating the fluid through the inlet path at a higher average speed than through the outlet path. This may be achieved by having cross-sections surfaces of different values as far as the inlet and outlet paths are concerned;
- a step of measuring the temperature of the fluid in at least one path among the inlet path and the outlet path, to allow a control of the flow temperature, as well as its homogeneity.

According to another aspect of the invention, there is provided a heating device for heating an electrically conductive fluid circulating in the device, comprising:
- an inlet through which the fluid enters the device and an outlet through which the fluid exits the device,
- an inlet path extending substantially parallel to a longitudinal axis XX between a first axial end connected with the inlet and a second axial end axially spaced apart from the first axial end,
- an outlet path extending substantially parallel to the longitudinal axis XX between a first axial end and a second axial end connected with the outlet, the first axial end being axially located around the same axial position as the second axial end of the inlet path, the second axial end of the outlet path being axially located around the same axial position as the first axial end of the inlet path,
- fluid transfer means for allowing the fluid flowing out through the second axial end of the inlet path to flow in through the first axial end of the outlet path,
- a plurality of electrodes for applying at least one voltage in the fluid flowing through the outlet path, the device of the invention further comprising an at least partially electrically insulated partition wall contiguous with the inlet and outlet paths and axially extending between the axial position of the first end of the inlet path and the axial position of the second end of the inlet path, said partition wall allowing heat transfer by conduction between said inlet path and said outlet path.

According to some embodiments, the device of the invention may further comprise:
- a plurality of electrodes for applying at least one voltage in the fluid flowing through the inlet path;
- electrodes located toward the axial ends of the inlet path and/or the outlet path;
- a partition wall of a substantially tubular shape radially enclosing the outlet path;
- an external wall of a tubular shape radially enclosing the inlet path;
- a partition wall and/or an external wall of a substantially circular section or of any other section.

The average cross-section surface of the inlet path may be similar to, or smaller than the average cross-section surface of the outlet path. This allows adjusting the respective flow in the inlet and the outlet path, and so the time of travel of a given portion of fluid in these inlet and outlet paths and control the way it will be heated.

According to some embodiments:
- the fluid transfer means may comprise a direct fluid connection between the second axial end of the inlet path and the first axial end of the outlet path;
- the fluid transfer means may comprise an intermediate outlet for allowing the fluid to flow out the second axial end of the inlet path, and an intermediate inlet for allowing the fluid to flow in through the first axial end of the outlet path.

Additionally, the heating device of the invention may further comprise an additional inlet on the first axial end of the outlet path. This additional inlet may allow inserting another product, liquid, in paste, or in the shape of a solid bar, to obtain at the outlet a compound product.

It is indeed an advantage of the invention that it makes it possible to design a substantially linear outlet path with a specific section and shape and no asperities which allows cooking liquid products (such as eggs for instance) to the point that they solidify in the last section of the outlet path and are extruded through the outlet under the pressure of the fluid injected through the inlet. Heat transfers may be adjusted so that the product do not solidify close to the partition wall which is cooled by the incoming fluid in the inlet path, to leave a film of fluid which avoid adhesion to the wall.

Additionally, the heating device of the invention may further comprise on the outlet side retention means with substantially narrow apertures opposing to the flow and allowing maintaining a pressure in the outlet path higher than outside. So the product may be heated at temperatures higher than 100° in the outlet path while being kept liquid, and extruded through the apertures where it solidifies in the form of foam while the water inside vaporises and creates a pattern of empty microcells. For instance cereals may be treated this way.

According to a further aspect of the invention, it is proposed a system for heating an electrically conductive fluid, comprising a plurality of heating device of the invention with an intermediate outlet in fluid connection with an inlet of another device, and an intermediate inlet in fluid connection with the outlet of the same other device.

So the heating systems of the invention may be cascaded for a better efficiency, with for instance the fluid flowing through all the inlet paths of the devices and then through all the outlet paths of the same devices in reverse order.

The heating systems of the invention may also be cascaded in a more classical way, with the fluid flowing from the inlet to the outlet of a device and then through another one.

DESCRIPTION OF THE DRAWINGS

The methods according to embodiments of the present invention may be better understood with reference to the drawings, which are given for illustrative purposes only and are not meant to be limiting. Other aspects, goals and advantages of the invention shall be apparent from the descriptions given hereunder.

For clarity, identical or similar elements of the invention will be referenced with identical reference numbers in all figures.

DETAILED DESCRIPTION

Figure 1:
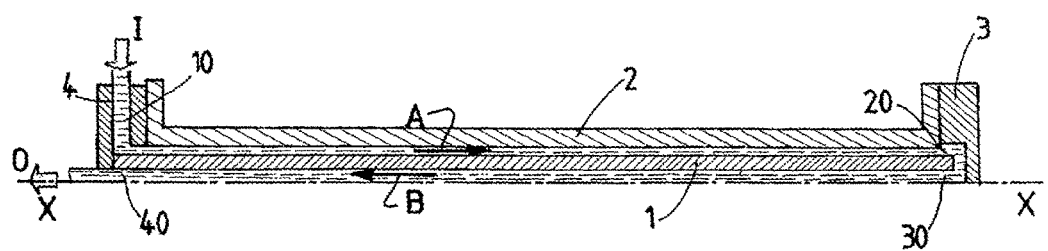
FIG. 1 is a longitudinal section of a schematic first embodiment of the invention.

FIG. 1 illustrates a first embodiment of the invention that essentially comprises an inlet I and an outlet O between which an electrically conductive fluid circulates in a circuit. The inlet is connected to a pump for delivering the fluid under pressure to the fluid circuit. The circuit comprises at least an inlet path and an outlet path. The inlet path extends parallel to a longitudinal axis XX between a first axial end 10 connected with the inlet I and a second axial end 20 axially spaced apart from the first axial end 10. The outlet path extends parallel to the longitudinal axis XX between a first axial end 30 and a second axial end 40 that is axially spaced apart from the first axial end 30.

The paths are mutually positioned such that the first axial end 30 of the outlet path is axially located at the same axial position as the second axial end 20 of the inlet path, and in fluid connection with the latter. Moreover, the second axial end 40 of the outlet path is axially at the same axial position as the first axial end 10 of the inlet path.

At least two electrodes 3,4 are located between the first end 10 and the second end 20 of the inlet path. According to this embodiment, these end electrodes 3,4 are located close to the first end 30 and the second end 40 of the outlet path. The end electrodes 3,4 located at the ends of the tubular external wall 2, allow an alternating electric current to be generated in the electrical conductive fluid to be treated and hence to heat it, as will be detailed later.

Such an arrangement can be obtained through two coaxial tubular means 1, 2 wherein the inner tube 1 is a partition wall that radially encloses the outlet path. The external tubular means 2 radially encloses the inlet path.

Both tubular means 1,2 are electrically insulated, and the inner or partition wall 1 is thus contiguous with both inlet and outlet paths as shown on FIG. 1.

The inner or partition wall 1 is made of a material having high thermal conductivity, and it has a rather small thickness in order to transfer heat as will be explained later.

An electrically conductive fluid circulates from the inlet I to the outlet O of the thus created circuit through an inlet path in which the fluid circulates in a first direction as illustrated by arrow A, and then through an outlet path where the fluid circulates in a second direction referenced by arrow B. The first direction A is opposite to the second direction B.

The inlet I of the circuit is for example constituted by a channel through the first end electrode 4. The fluid flows firstly through the inlet path radially defined between the inner tube 1 and the outer tube 2, in the first direction A. The second end electrode 3 (voltage electrode) which is positioned at an axially end distance from the inner partition wall 1 has also the function of deviating the flow which thereafter circulates in the second direction B opposite to the first one A, all along and inside the inner tube 1. The electrically conductive fluid flows thus to the outlet O axially positioned near the inlet I and it is once more heated between second electrode 3 and first electrode 4 (grounded). The inner tube 1 is an electrically insulated partition wall such that heat is transferred by heat conduction from the fluid flowing through the outlet path to the fluid flowing through the inlet path.

According to the embodiment illustrated in FIG. 1 only two electrodes 3,4 are provided at each ends of both the inlet and the outlet paths. Moreover these electrodes 3,4 are directly and partially immersed with the fluid to be treated.

The arrangement is such that the inlet I is provided through the first electrode 4.

The respective dimensions of the tubes 1,2, are such that the cross-section of the inlet path has nearly the same value as the cross-section of the outlet path. According to a preferred embodiment, the cross-section of the inlet path is lower than the cross-section of the outlet path.

The second alternative creates bigger residence time for the fluid in the outlet path and consequently lower temperatures of the fluid in the inlet path, as well as lower wall temperatures as will be shown later on.

According to an example, the thickness of the inner partition wall 1 is about 2.5 mm whereas the thickness of the tubular external wall 2 is about 8 mm. The external diameter of external wall 2 is about 50 mm whereas the external diameter of partition wall 1 is about 28 mm. In this example the fluid flow is about 150 l/h.

Figure 2:
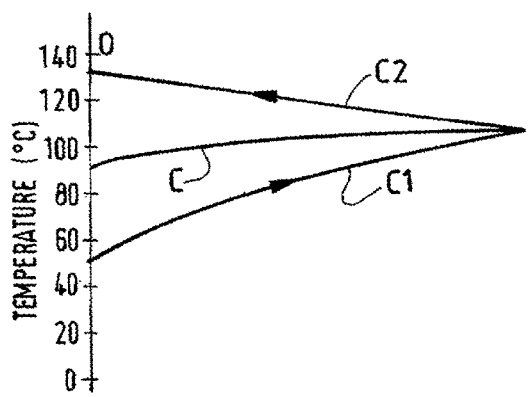
FIG. 2 shows curves of the fluid and wall temperatures along the length of a heating device according to the first embodiment of the invention.

FIG. 2 illustrates the fluid temperatures respectively in the inlet path (curve C1) and in the outlet path (curve C2) in case of same cross-sections values for both inlet and outlet paths. The third curve C is the partition wall temperatures along said wall 1. A first temperature increase is obtained due to Joule effect in the inlet path: from about 50° C. at the first end 10 of the inlet path to about 100° C. at the second end 20 of the inlet path. This end temperature increases to about 130° C. when fluid circulates from the first end 30 of the outlet path to the second end 40 of outlet path which axially coincides with the circuit outlet O.

It is interesting to point out that temperatures increase regularly and slowly from the input I to the output O of the circuit. Moreover, the partition wall temperature increases very slowly and regularly: from about 90° C. to 100° C. maximum. In other words, the partition wall 1 has an average temperature that slightly varies axially. This is an important advantage because this allows to considerably limit the clogging and/or fouling of the partition wall 1 by local overheating(s).

The fluid pressure difference between input I and output O is very slim. This allows having thin thicknesses for the partition wall 1 which grants good heat transfer by conduction.

Figure 3:
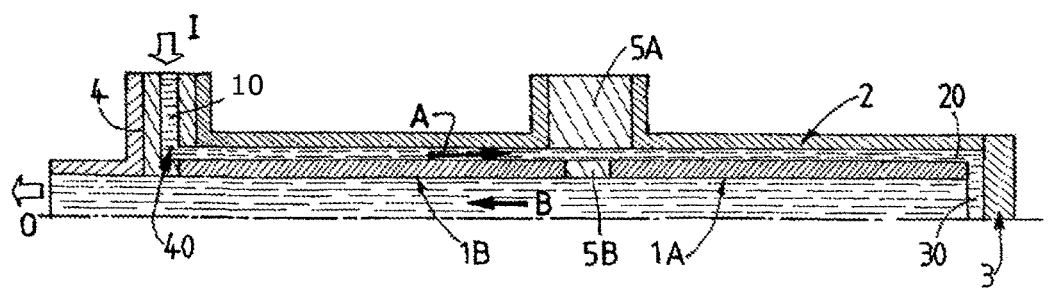
FIG. 3 is a longitudinal section of a schematic second embodiment of the invention.

FIG. 3 relates to another embodiment which differs from the first one by a further or intermediate electrode 5A, 5B axially located between first electrode 4 and second electrode 3 and which is also in direct contact with the electrically conductive fluid: the intermediate electrode comprises an inner ring 5B included in the partition wall 1 as well as an outer part 5A included in the external wall 2. This further electrode 5A,5B is the voltage electrode while electrodes 3 and 4 are grounded.

In this embodiment, the cross-section of the inlet path can be equal to or lower than the cross-section of the outlet path.

Figure 4:
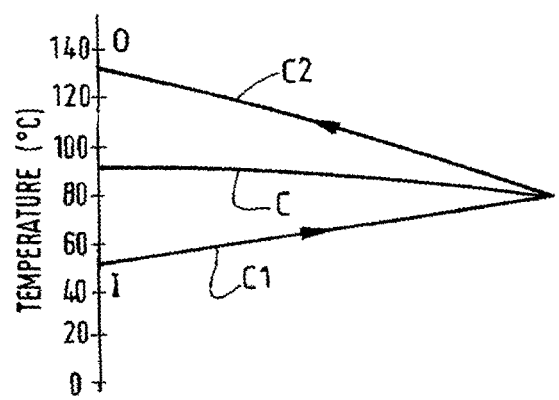
FIG. 4 shows curves of the fluid and wall temperatures along the length of a heating device according to the second embodiment of the invention.

FIG. 4 relates to a lower cross-section for the inlet path: the inner wall temperatures slightly decreases (curve C) along the wall, from circuit input/output (I/O) to circuit opposite ends 20, 30. These lower surface temperatures clearly avoid clogging of said inner partition wall 1.

Figure 5:
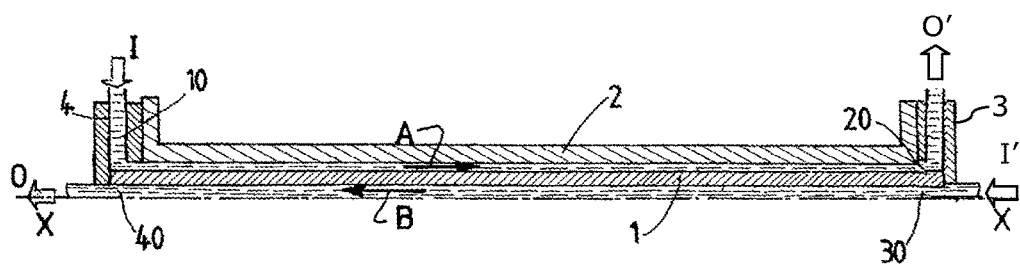
FIG. 5 is a longitudinal section of a schematic third embodiment of the invention.

Another embodiment of the invention is shown on FIG. 5. The structure comprises the same elements as the structure illustrated on FIG. 1, together with additional means which are the intermediate inlet I' and the intermediate outlet O'.

In this embodiment, the second axial end 20 of the inlet path is not in direct fluid connection with the first axial end 30 of the outlet path. The fluid, after flowing through the inlet path in direction A leaves the device through the intermediate outlet O', and the intermediate inlet I' allows injecting it in the outlet path, so that it can flox in direction B.

This embodiment allows cascading heating devices of the invention, with all inlet paths in series first, and then all outlet paths in series, along the path of the fluid. This is achieved by connecting the intermediate outlet O' of the first heating device to the inlet I of the second heating device, and the outlet O of that second heating device to the intermediate inlet I' of the first heating device, and so on for the next devices. The last heating device may be a device of the embodiment of FIG. 1, or a device of the embodiment of FIG. 5 with the intermediate outlet O' connected to the intermediate inlet I'.

By doing so, it is possible to build a heating system composed of a plurality of smaller heating devices which is functionally equivalent to a single large heating device with an inlet path and an outlet path whose lengths correspond to the sum of the lengths of the inlet paths and the outlet paths of the individual smaller heating devices, respectively.

The same result may of course be achieved with modified systems based on the embodiment of FIG. 3 or any other applicable embodiment.

Of course, the devices of the invention may also be cascaded so that an outlet O of a first device is connected to the inlet I of another device, and so on.

At least one temperature sensor (non visible) is advantageously provided at least at inlet I and/or at outlet O of the circuit and it allows to continuously control the electrodes power and consequently the fluid temperature within the circuit.

Besides, the inner partition wall 1 remains rather cold which generates a low viscosity parietal layer, the later one facilitates the fluid flowing therein. This layer provides a continuous lubrication of the inside of this wall which decreases pressure therein. A very nice flow is thus provided in the device according to the invention.

Particularly, products with viscosities varying according to temperatures can be handled according to the invention: at fluid outlet, such products will show a high inside viscosity and a low outside viscosity. Viscosity increases when temperature decreases.

For example at fluid outlet, a cake will be cooked at heart (inside) and will show a low viscosity outside. Sponge bread can be provided, without outside crust.

As clearly appearing from the above specification, a single fluid circuit is used which significantly simplify both the method and the device according to the invention.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for heating an electrically conductive fluid comprising steps of:
    circulating the fluid in a circuit from an inlet to an outlet, through an inlet path of the circuit in which the fluid flows in a first average direction, and through an outlet path of the circuit in which the fluid flows in a second average direction substantially opposite to the first direction, wherein said inlet path has an inlet length extending from a first wall to a second wall, and said outlet path has an outlet length extending from said second wall to said first wall;
    subjecting the fluid to ohmic heating while the fluid flows through the outlet path; and
    transferring heat from the fluid flowing through the outlet path to the fluid flowing through the inlet path by thermal conduction through an electrically insulated partition wall separating said inlet path and said outlet path, wherein said electrically insulated partition wall extends along a majority of an entire length of said inlet length and said outlet length.

2. The method of claim 1, further comprising a step of subjecting the fluid to ohmic heating while said fluid flows through the inlet path.

3. The method of claim 1, further comprising at least one of the following steps:
    applying at least one voltage inducing ohmic heating in the fluid flowing through the inlet path between at least two electrodes arranged in said inlet path; and
    applying at least one voltage in the fluid flowing through the outlet path between at least two electrodes arranged in said outlet path.

4. The method of claim 3, further comprising at least one of the following steps:
    applying a first and a second voltage inducing ohmic heating in the fluid flowing through the inlet path, said first voltage being applied between a first electrode arranged substantially toward a first axial end of the inlet path and a second electrode arranged substantially toward the middle of the inlet path, and said second voltage being applied between said second electrode and a third electrode arranged substantially toward a second axial end of the inlet path; and
    applying a third and a fourth voltage inducing ohmic heating in the fluid flowing through the outlet path, said third voltage being applied between a fourth electrode arranged substantially toward a first axial end of the outlet path and a fifth electrode arranged substantially toward the middle of the outlet path, and said fourth voltage being applied between said fifth electrode and a sixth electrode arranged substantially toward a second axial end of the outlet path.

5. The method of claim 1, further comprising a step of inducing ohmic heating in the fluid by applying AC voltage between electrodes at least partially in contact with the fluid.

6. The method of claim 1, further comprising a step of circulating the fluid through the inlet path at a higher average speed than through the outlet path.

7. The method of claim 1, further comprising a step of measuring the temperature of the fluid in at least one path among the inlet path and the outlet path.

8. The method of claim 1, wherein said first wall and said second wall are electrodes.

9. A method for heating an electrically conductive fluid comprising steps of:
    circulating the fluid in a circuit from an inlet to an outlet, through an inlet path of the circuit in which the fluid flows in a first average direction, and through an outlet path of the circuit in which the fluid flows in a second average direction substantially opposite to the first direction;
    subjecting the fluid to ohmic heating while the fluid flows through the outlet path; and providing an electrically insulated partition wall between said inlet path and said outlet path, wherein said partition wall extends along a majority of an entire length of said inlet length and said outlet length, said entire length defined between opposing ends of said inlet path and said outlet path, wherein no ohmic heating occurs through said partition wall; and transferring heat from the fluid flowing through the outlet path to the fluid flowing through the inlet path by thermal conduction through said electrically insulated partition wall.

\* \* \* \* \*